(12) United States Patent
Tsai et al.

(10) Patent No.: US 6,842,407 B2
(45) Date of Patent: Jan. 11, 2005

(54) METHOD AND APPARATUS FOR TRACKING SERVO SYSTEM

(75) Inventors: Chin-Shiong Tsai, Tainan Hsien (TW); Chien-Da Chen, Tainan Hsien (TW); Meng-Chang Lin, Kaohsiung Hsien (TW)

(73) Assignee: Discovision Associates, Irvine, CA (US)

( * ) Notice: Subject to any disclaimer, the term of this patent is extended or adjusted under 35 U.S.C. 154(b) by 389 days.

(21) Appl. No.: 09/932,648

(22) Filed: Aug. 17, 2001

(65) Prior Publication Data

US 2002/0131337 A1 Sep. 19, 2002

(30) Foreign Application Priority Data

Mar. 16, 2001 (TW) ........................................ 90106219 A

(51) Int. Cl.$^7$ ................................................ G11B 7/00
(52) U.S. Cl. ................................ 369/44.25; 369/44.28; 369/53.23; 369/53.28
(58) Field of Search ........................... 369/44.11, 44.14, 369/44.25, 44.28, 44.32, 53.23, 53.28, 44.1, 44.29

(56) References Cited

U.S. PATENT DOCUMENTS 6,104,681 A * 8/2000 Yonezawa ................ 369/44.25
6,341,107 B1 * 1/2002 Watanabe ................ 369/44.25

* cited by examiner

*Primary Examiner*—Doris H. To
*Assistant Examiner*—Jorge Leonardo Ortiz-Criado
(74) *Attorney, Agent, or Firm*—Keiji Masaki; Steve A. Wong; Caroline Do

(57) ABSTRACT

The present invention provides a method for guiding a pick-up head to follow an information track. The method comprises the steps of sensing and sending notification of displacement between the pick-up head and the center of the information track, generating a first correction directly proportional to the displacement, generating from the first correction a second correction non-proportional to the displacement, generating a third correction from an amplified tracking error signal and generating a driving force proportional to the sum of the second and third corrections, driving the pick-up head to follow the information track.

15 Claims, 3 Drawing Sheets

METHOD AND APPARATUS FOR TRACKING SERVO SYSTEM

BACKGROUND OF THE INVENTION

1. Field of the Invention

The present invention relates to a tracking servo system and particularly to a method and apparatus for a tracking servo system wherein RF jitter is reduced by providing new circuitry rather than a low gear ratio.

2. Description of the Prior Art

An optical disc storage device can be either a device or system that is capable of retrieving information stored on an optical disc, or a device or system capable of recording information to and retrieving information from an optical disc. Examples of optical disc storage devices that are capable of retrieving information from an optical disc include compact disc (CD) players, video laser disc (LD) players and compact disc read-only-memory (CD-ROM) drives. Examples of optical disc storage devices that are capable of both recording information to an optical disc and retrieving information from an optical disc include recordable mini-disc (MD) players, magneto-optical (MO) disc drives and compact disc recordable (CD-R) drives.

Information is generally stored on an optical disc in the form of concentric or spiral tracks referred to as information tracks. In cases where information is already stored on an optical disc, the information tracks contain regions of optical contrast that represent the stored information. In the case of an unrecorded or blank optical disc containing pre-formatted tracks for recording information, a track that will become an information track may or may not have regions of optical contrast.

When an optical storage device is in its normal mode of operation, i.e. retrieving information from or recording information to an optical disc, the storage device rotates the disc while using a light beam emitted from a pick-up head to retrieve information from or record information to the disc. As the optical disc rotates, the pick-up head radially traverses the disc. This motion of the pick-up head and its direction are referred to as track following and track direction, respectively. When the pick-up head traverses the optical disc, a tracking servo system in the optical disc storage device keeps the beam of light emitted from the pick-up head centered on the information track, or the track that will become the information track in the case of recording information to a disc.

The optical disc tracking servo system is a closed loop in system that guides the pick-up head to follow the optical disc information track during normal operation. The tracking servo system readjusts the radial position of the pick-up head by sensing when the pick-up head or the light beam drifts off the center of the information track.

FIG. 1 is a cross-sectional diagram showing the pick-up head and spindle of an optical disc storage device. An optical disc 11 has a concentric or spiral information track 111 and is disposed on a spindle 12 which rotates the optical disc 11. A pick-up head 13 has a lens 131 and a fine actuator 132 which drives the fine track-following motion of the lens 131. A coarse actuator 14 drives a coarse track-following motion of the pick-up head when a light beam (not shown) emitted from the lens 131 cannot be centered on the information track 111 only with the actuator 132.

FIG. 2 is a block diagram showing a conventional tracking servo system in the above described optical disc storage device. The same elements in FIG. 1 and FIG. 2 are referred to by the same symbols. The tracking servo system 2 is a closed loop which comprises a fine controller 211, a fine driver 212, a fine actuator 132, a coarse controller 221, a coarse driver 222, a coarse 14 an optical sensor 23 and a pre-amplifier 24.

The optical sensor 23 senses displacement between the pick-up head and the center of the information track 111 and notes the displacement with a Tracking Error Signal TES. The signal TES is amplified by the pre-amplifier 24 and sent to the fine controller 211.

The fine controller 211 receives the amplified signal TES and accordingly generates a fine correction which is proportional to the displacement. The fine correction is sent with a fine correction signal FCS to the fine driver 212. The fine driver 212 receives the signal FCS and sends a fine driving signal FDS to the fine actuator 132 which accordingly generates a fine driving force to drive the track-following motion of the lens 131. The magnitude of the fine driving force is also linearly proportioned to the value of the fine correction sent with the signal FCS.

The coarse controller 221 receives the signal FCS sent by the fine controller 211. With a sampling rate lower than that of the fine controller 211, the coarse controller 221 low-pass-filters the signal FCS and generates a coarse correction which is sent with a coarse correction signal CCS. After receiving the signal CCS the coarse driver 222 sends a coarse driving signal CDS to the coarse actuator 14 which generates a coarse driving force to drive the track-following motion of the pick-up head. The magnitude of the coarse driving force is also linearly proportioned to the value of the coarse correction sent with the signal CCS.

Precisely speaking, the pick-up head is seldom centered on the information track by the above tracking servo system due to the friction of the gears. The track-following motion of the pick-up head is possible only when the coarse actuator generates a driving force stronger than the friction. This makes the essential displacement between the pick-up head and the center of the information track, i.e. the displacement cannot be zero, which results in RF jitter.

Theoretically, the above problem may be reduced to a small extent by increasing the gain of the coarse controller. This helps conquer the friction and makes a smaller displacement. However, to a liner closed-loop system, a large gain of the coarse controller tends to diverge the above tracking system and become unstable.

Traditionally, a low gear ratio is provided to solve the above problem but it elongates the access time of the optical disc storage device.

SUMMARY OF THE INVENTION

The object of the present invention is to provide a method and apparatus for a tracking servo system which provides a driving force whose magnitude is not linearly dependent upon the displacement between the pick-up head and the information track to overcome the friction between mechanical components and eliminate the essential displacement.

To achieve the above-mentioned object, the present invention provides a tracking servo system for guiding a pick-up head to follow an information track, comprising a first, second, third and fourth means. The first means senses and notes displacement between the pick-up head and the center of the information track. The second means receives the displacement notification and sends a first correction directly proportional to the displacement. The third means receives the displacement notification and sends a second correction non-proportionate to the displacement. The fourth means receives the first and second corrections and produces a driving force proportional to the sum of the first and second corrections, driving the pick-up head to follow the information track.

Another object of the invention is to provide a tracking servo system for guiding a pick-up head to follow an information track, comprising a sensor, a first and second controller, a decision-making ruler, and a first and second driving device. The sensor registers and sends notice of displacement between the pick-up head and the center of the information track with an error signal. The first controller receives the error signal and sends a first correction signal proportionate to the error signal. The second controller low-pass-filters the first correction signal and then sends a second correction signal. The decision-making ruler receives the error signal and sends a third correction signal disproportionate to the error signal. The first driving device receives the first correction signal and sends a first driving force proportionate to the second correction signal, driving the pick-up head to follow the information track. The second driving device receives the second and third correction signal and sends a second driving force linearly related to a sum of the second and third correction signal for driving the pick-up head to follow the information track.

Another object of the invention is to provide a method for guiding a pick-up head to follow an information track. The method comprises the steps of sensing and sending notice of displacement between the pick-up head and the center of the information track, generating a first correction proportionate to the displacement, generating a second correction disproportionate to the displacement and generating a driving force proportionate to the sum of the first and second corrections for driving the pick-up head to follow the information track.

In the present invention, a decision-making ruler is provided to generate a correction non-linear to the displacement between the pick-up head and the information track by logic or "fuzzy" control method. Thereby, the tracking servo system can be stable and drive the pick-up head centered on the information track.

BRIEF DESCRIPTION OF THE DRAWINGS

The present invention will become more fully understood from the detailed description given herein and the accompanying drawings, given by way of illustration only and thus not intended to be limitative of the present invention.

DETAILED DESCRIPTION OF THE INVENTION

Figure 1:
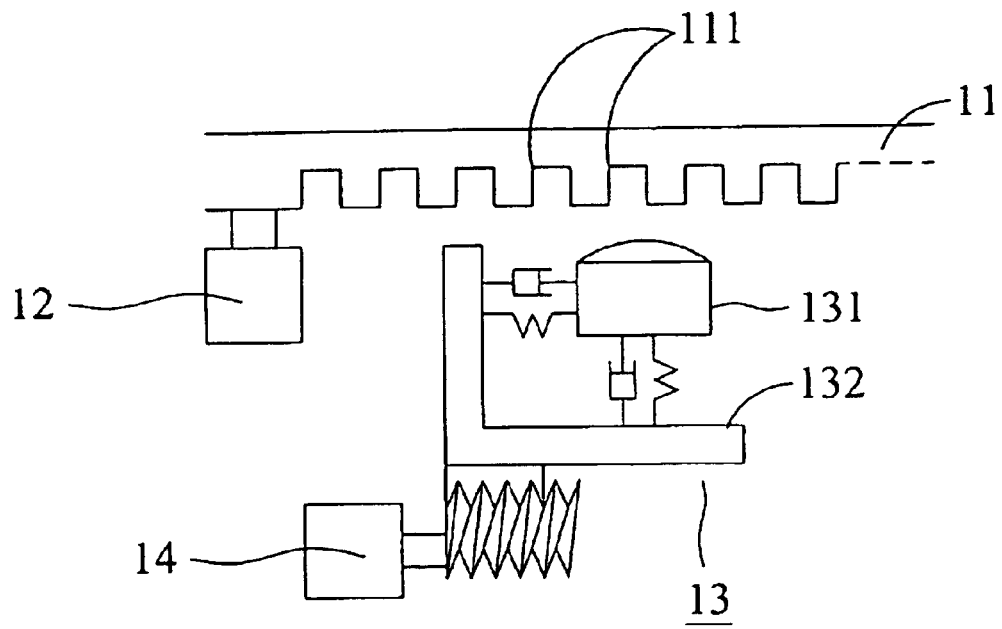
FIG. 1 is a cross-sectional diagram showing a pick-up head and a spindle of an optical disc storage device.
Figure 2:
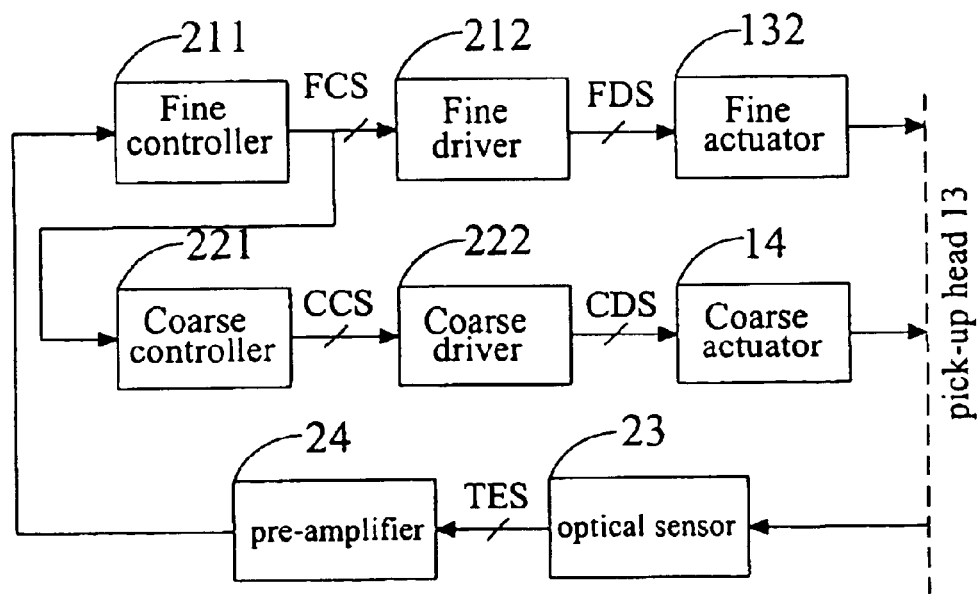
FIG. 2 is a block diagram showing a conventional tracking servo system in an optical disc storage device.
Figure 3:
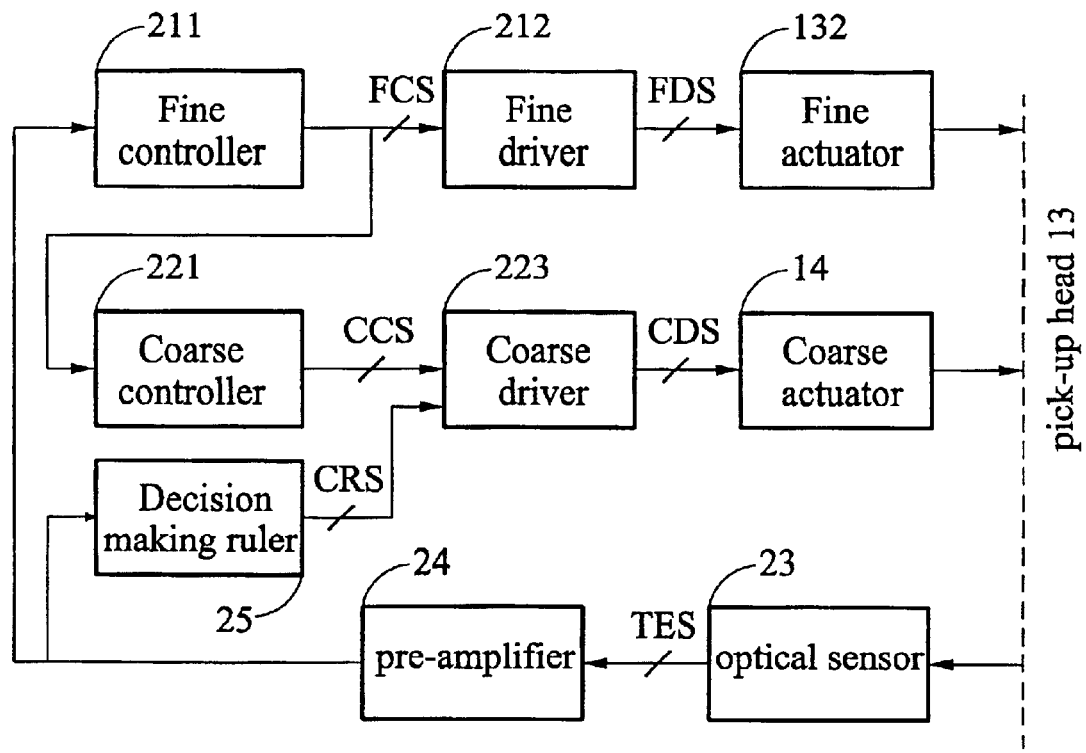
FIG. 3 is a block diagram showing a tracking servo system in an optical disc storage device according to an embodiment of the present invention.

FIG. 3 is a block diagram showing a tracking servo system in an optical disc storage device according to an embodiment of the present invention. The same elements in FIG. 1 and FIG. 2 are referred to by the same symbols.

A closed-loop tracking servo system 3 comprises a fine controller 211, a fine driver 212, a fine actuator 132, a coarse controller 221, a coarse driver 223, a coarse actuator 14, optical sensor 23, a pre-amplifier 24 and a decision-making ruler 25.

The optical sensor 23 senses displacement between the pick-up head and the center of the information track 111 and sends the displacement with a Tracking Error Signal TES. The signal TES is amplified by the pre-amplifier 24 and sent to the fine controller 211.

The fine controller 211 receives the amplified signal TES and accordingly generates a fine correction that is proportional to the displacement. The fine correction is sent with a fine correction signal FCS to the fine driver 212. The fine driver 212 receives the signal FCS and sends a fine driving signal FDS to the fine actuator 132 which accordingly generates a fine driving force to drive the track-following motion of the lens 131. The magnitude of the fine driving force is also linearly proportioned to the value of the fine correction sent with the signal FCS.

The coarse controller 221 receives the signal FCS sent by the fine controller 211. With a sampling rate lower than that of the fine controller 211, the coarse controller 221 low-pass-filters the signal FCS and generates a first coarse correction which is sent with a first coarse correction signal CCS.

The decision-making ruler 25 receives the amplified signal TES from the pre-amplifier 24 and accordingly generates a second coarse correction by a decision method (explained later). The second coarse correction is then sent with a second coarse signal CRS to the coarse driver 223.

Please note that the coarse driver 223 receives two coarse corrections from the coarse controller 221 and the decision-making ruler 25 with the signal CCS and CRS, respectively. This makes the coarse driver 223 different from the coarse driver 222 in FIG. 2. The coarse driver 223 adds the two coarse corrections with an adder (not shown) and sends the sum to the coarse actuator 14 with a coarse driving signal CDS. Then, the coarse actuator 14 generates a coarse driving force to drive the track-following motion of the pick-up head. The magnitude of the coarse driving force is also proportional to the value of the sum of the two coarse corrections sent with the signal CCS and CDS respectively.

Figure 4:
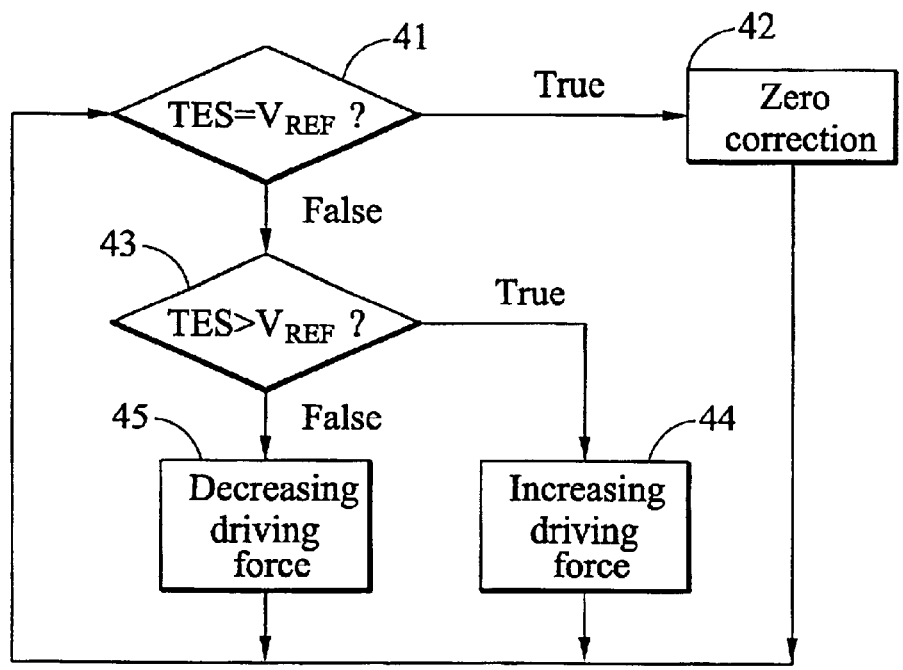
FIG. 4 is a flowchart showing a decision method of the decision-making ruler according to an embodiment of the present invention.

The above-mentioned decision method will be explained in cooperation with FIG. 4.

In step 41, the decision-making ruler 25 pre-stores the value of a reference voltage VREF which is the voltage level of the signal TES when the pick-up head is centered on the information track. The decision-making ruler 25 determines if the voltage level of the signal TES is VR3F. If it is, the decision-making ruler 25 sends a zero correction in step 42 and repeats step 41 at the next sampling. If it is not, the decision-making ruler 25 further determines if the voltage level is higher than $V_{REF}$ in step 43. If the level is higher, and radial position of pick-up head goes behind the center of the information track and the displacement is in a positive direction, then in step 44, a positive coarse correction is generated making the coarse driving force stronger. If the radial position of the pick-up head is beyond the center of the information track and the displacement is in a negative direction, in step 44, a negative coarse correction occurs.

Figure 5:
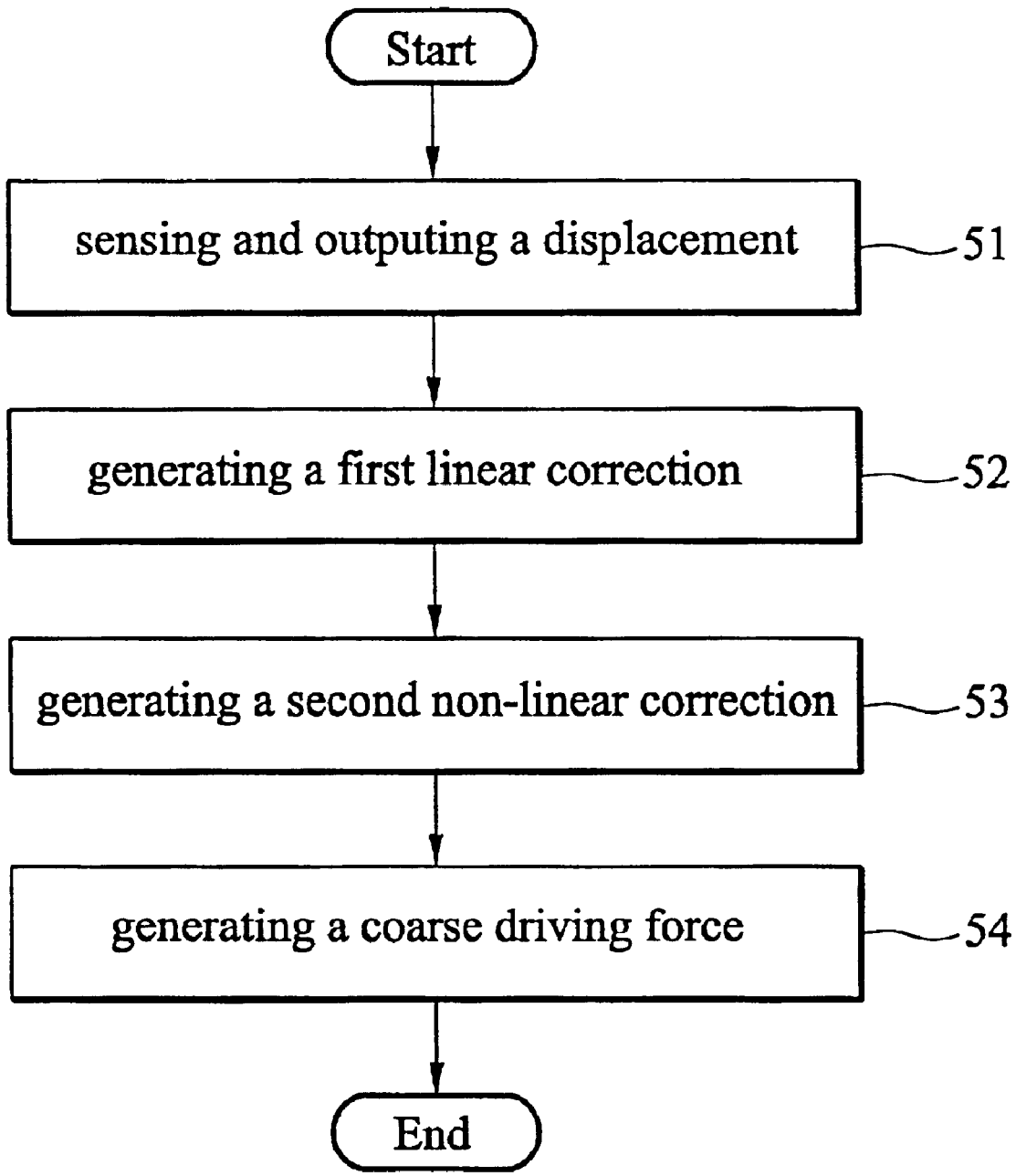
FIG. 5 is a flowchart showing a method of a tracking servo system according to an embodiment of the present invention.

FIG. 5 is a flowchart showing the method of a tracking servo system according to an embodiment of the present invention.

First, in step 51, a displacement between the pick-up head and the center of the information track is sensed and sent out.

Second, in step 52, a first coarse correction directly proportional to the displacement is generated.

Third, in step 53, a second coarse correction non-proportional to the displacement is generated by a logic or "fuzzy" control method.

Finally, a coarse driving force proportional to the sum of the first and second coarse corrections is generated, driving the pick-up head to follow the information track.

In the present invention, new circuitry with a decision-making ruler is provided to generate a driving force disproportionate to the displacement between the pick-up head and the information track. Thereby, the tracking servo system can be stable and drive the pick-up head precisely centered on the information track. A low gear ratio is not necessary.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A tracking servo system for guiding a pick-up head to follow an information track, comprising:
   a first means for sensing and sending a notice of displacement between the pick-up head and the center of the information track;
   a second means for receiving the displacement notice and sending a first correction proportionate to the displacement;
   a third means for receiving the first correction to generate a second correction disproportionate to the displacement; and
   a fourth means for receiving the second and a third corrections, and producing a driving force proportionate to the sum of the second correction and the third correction for driving the pick-up head to follow the information track, the third correction being generated from an amplified tracking error signal.

2. The system as claimed in claim 1 wherein the information track is an optical disc.

3. The system as claimed in claim 1 wherein the first means is an optical sensor.

4. The system as claimed in claim 1 wherein the pick-up head comprises a lens.

5. The system as claimed in claim 1 wherein the first means sends the displacement with a track error signal.

6. A tracking servo system for guiding a pick-up head to follow an information track, comprising:
   a sensor configured to sense and send a notice of displacement between the pick-up head and the center of the information track;
   a first controller configured to receive the displacement notice and send a first correction proportionate to the displacement;
   a second controller configured to receive the first correction to generate a second correction disproportionate to the displacement; and
   a driver configured to receive the second and a third corrections, and producing a driving force proportionate to the sum of the second and third corrections for driving the pick-up head to follow the information track, the third correction being generated from an amplified tracking error signal.

7. The system as claimed in claim 6 wherein the information track is on an optical disc.

8. The system as claimed in claim 6 wherein the sensor is an optical sensor.

9. The system as claimed in claim 6 wherein the pick-up head comprises a lens.

10. The system as claimed in claim 6 wherein the sensor sends the displacement with a track error signal.

11. A tracking servo method for guiding a pick-up head to follow an information track, comprising the steps of:
    sensing a notice of displacement;
    sending said notice of displacement between the pick-up head and the center of the information track;
    receiving the displacement notice and sending a first correction proportionate to the displacement;
    receiving the first correction and generating a second correction disproportionate to the displacement; and
    receiving the second and a third corrections, and producing a driving force proportionate to the sum of the second and third corrections for driving the pick-up head to follow the information track, the third correction being generated from an amplified tracking error signal.

12. The method as claimed in claim 11 wherein the information track is on an optical disc.

13. The method as claimed in claim 11 wherein the sensor is an optical sensor.

14. The method as claimed in claim 11 wherein the pick-up head comprises a lens.

15. The method as claimed in claim 11 wherein the sensor sends the displacement with a track error signal.

\* \* \* \* \*